Patented July 16, 1935

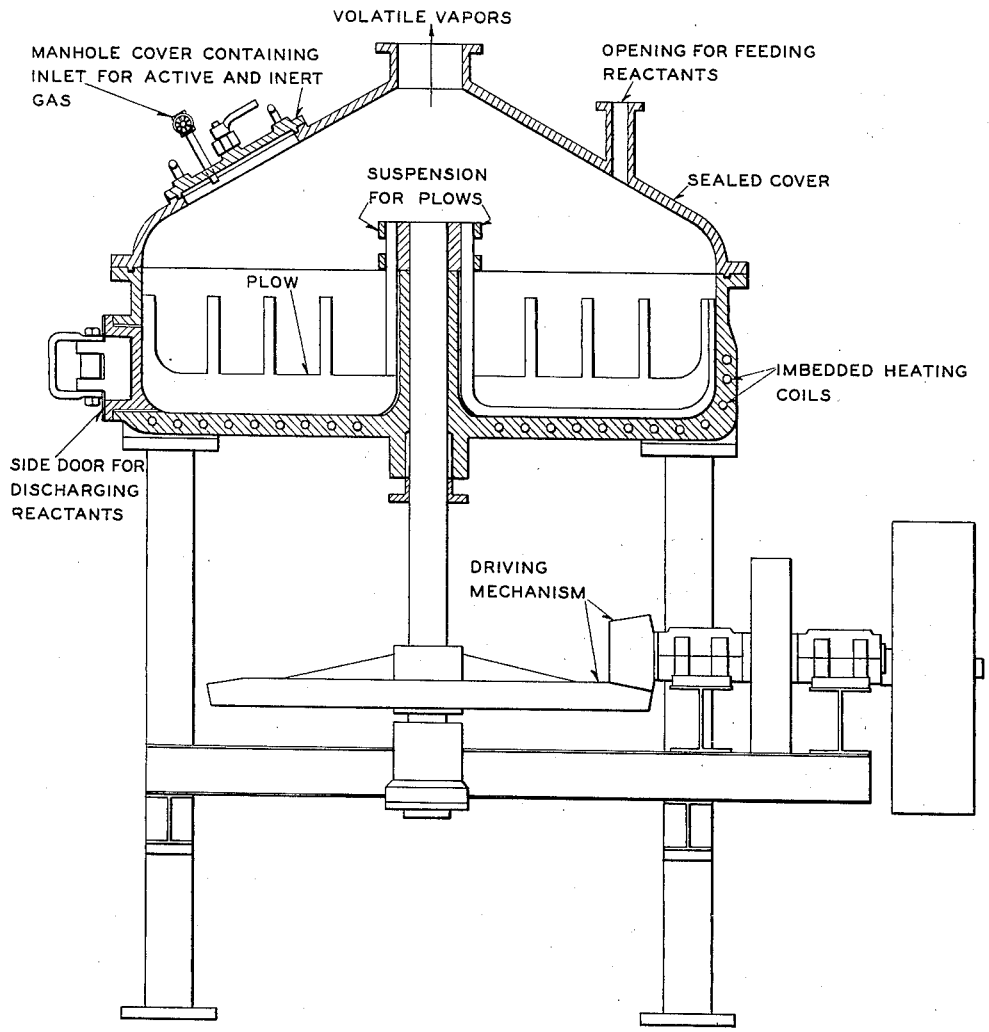
REACTOR FOR CARRYING OUT FRIEDEL AND CRAFTS REACTIONS

2,008,418

UNITED STATES PATENT OFFICE 2,008,418

PROCESS FOR PREPARING USEFUL PRODUCTS ACCORDING TO THE FRIEDEL AND CRAFTS REACTION

Philip H. Groggins, Washington, D. C., assignor to Secretary of Agriculture of the United States of America Application May 28, 1934, Serial No. 727,949

10 Claims. (Cl. 260—64)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

My invention relates to improvements in the manufacture of useful products by means of the Friedel and Crafts reaction, and it relates more particularly to the mode of carrying out such reactions. Specifically, my discovery furnishes a new method of preparing aluminum chloride addition compounds of ketones, keto acids, aldehydes, and other organic compounds in the form of granulated particles, a viscous resinous paste or a fluid suspension.

Heretofore, Friedel and Crafts reactions have been carried out in a ball mill reactor (U. S. 1,656,575) employing approximately the combining proportions of the reactants, thus producing a finely divided powdery material. This reaction has also been carried out in lead or enamel lined vessels, wherein a substantial excess of a liquid reactant or inert solvent was employed, in order to enable continuous stirring of the charge and to facilitate its subsequent removal from the reactor.

From the following considerations, it can be seen that both of these systems have restricted limitations, which are conducive either to inefficient or uneconomical operation, or both.

I have found that many condensations according to the Friedel and Crafts reaction can best be carried out in the presence of only a limited or moderate excess, i. e., from 0.5 to 2.5 moles of fluid reactant. Under such circumstances neither of the aforementioned reactors can be employed satisfactorily because of the viscous or resinous character of the reaction mass. I have also discovered that a large number of Friedel and Crafts syntheses are best initiated in the presence of a relatively large quantity of active or inactive fluid material, and, after a homogeneous and smooth reaction is obtained gradually to remove the excess of liquid reactant under slightly reduced pressure. I have furthermore ascertained that many condensations which proceed excellently in the liquid phase, as for example, the preparation of the aluminum chloride complex of 2-chlorobenzoylbenzoic acid, do not give satisfactory results, when conducted in the mill type reactor; and in some instances the latter is entirely unsuitable. Furthermore, many products which are made satisfactorily in a mill type reactor cannot be prepared as economically or efficiently in the liquid phase. Finally, I have found that the addition of finely divided halogen carriers, such as iron, aluminum, and zinc, do not markedly affect the yield or the quality of many products made by the Friedel and Crafts reaction. Of great importance technically is the fact that these finely divided halogen carriers react preferentially, and thus inhibit the attack of the reactants on an iron apparatus.

It is therefore the general object of my invention to provide a method and apparatus wherein practically any type of Friedel and Crafts reaction may best be carried out. To this end, I have discovered that a vertical, jacketed or thermocoil pan, commonly known or referred to as a "crystallizing pan" the latter being illustrated in the accompanying drawing, can be used advantageously. By referring to the drawing, it will be seen that the pan is provided with (1) a hermetically sealed cover containing suitable openings for feeding the reactants and removing the liberated gases and any desirable portion of the liquid reactant or solvent; (2) a modified plow for agitation of the charge; and, (3) a side door for discharging the reaction mass.

By comparison, some of the advantages of a reactor of this design may be set forth as follows:

I. *Homogeneity*.—The reactants may be introduced in a regulated manner while the stirrer is in motion. The modified plow insures (a) positive agitation, (b) scrapes the walls of the vessel, and (c) breaks the surface of the mass, and thus facilitates the escape of the liberated hydrogen chloride. These are considered ideal conditions for the performance of my invention.

II. *Removal of hydrogen chloride*.—By means of slightly reduced pressure, or the passage of a current of dry air over the charge, the liberated gas can be removed conveniently from the upper portion of the reactor. This obviates the serious estoppel of gases due to clogging in the hollow trunnion, a characteristic of the mill type reactor.

III. *Operating efficiency.*—This novel reactor, as illustrated by the drawing, permits initiating a reaction at any temperature with any desired molar ratio of active or inactive fluid component, and thus makes available the most efficient operating condition for carrying out my invention. It also provides means of removing any desired portion of the active or inactive fluid medium, thus assuring economical and accurately controlled operations.

IV. *Physical properties of reaction mass.*—By controlling the removal of the active or inactive fluid components under reduced pressure by the aid of jacket or thermocoil heating, the reaction mass can be obtained either as a non-dusting granulated product or as a viscous to resinous paste.

V. *Operating control.*—In the reactor, illustrated by the accompanying drawing, the operation can be carried out at any desired temperature and in vessels of iron or other suitable ferrous alloys. It provides the means of initiating normally vigorous reactions at sub-zero temperatures and finishing these at elevated temperatures. Various reactions require different conditions and this apparatus and process offers a convenient and exact method of control.

Since the reactions made possible by the Friedel and Crafts reaction are so numerous and of such divergent character, no specific temperature range can be given. The alkyl halides and low-molecular-weight acyl halides condense at zero to room temperatures, whereas acid anhydrides condense at 60 to 120° C. For the condensation of mono and dicarboxylic acids the temperature range is from 100 to 200° C.

VI. *Discharge of the reactor.*—By means of the side door, shown in the drawing, which is sealed during the condensation period, the reaction product can be delivered in almost any desired physical form to suitable containers for storage or transportation, or to another vessel for subsequent treatment. The dusting problem inherent in the discharge of the mill reactor is obviated, while the necessity of using large quantities of active or inactive fluid components essential to liquid phase reactions is not here necessary.

The apparatus illustrated by the drawing has many other advantages, which undoubtedly will become apparent to those familiar with the art of carrying out Friedel and Crafts reactions.

It is clear that many modifications either of detail in design, or materials of construction can be made in the reactor without departing from the spirit and scope of my invention.

My invention broadly considered is not restricted to details of apparatus or manipulation but of providing a general procedure for carrying out a wide variety of Friedel and Crafts syntheses, in a single reactor, and being able continuously to control the operation as to temperatures and pressures, as to fixed or variable ratios of reacting components, and to obtain the aluminum chloride complex in any desired form, ranging from a granulated mass to a viscous paste.

Having thus described my invention, what I claim for Letters Patent is:

1. In the manufacture of useful products according to the Friedel and Crafts reaction, the process which comprises mixing the organic reactants with anhydrous aluminum chloride at a suitable temperature range in a crystallizing pan until the conversion of the reactants to the anhydrous aluminum chloride addition compound is complete, and then discharging the same in any desired form, ranging from a granulated mass to a viscous product.

2. In the manufacture of keto acids according to the Friedel and Crafts reaction, the process which comprises mixing phthalic anhydride and a reacting aromatic compound of the benzene series with anhydrous aluminum chloride in a crystallizing pan at a temperature ranging from 5° to 150° C., until the conversion of the reactants to the anhydrous aluminum chloride addition compound of the aroylbenzoic acid is complete, and then discharging the same in any desired form, ranging from granulated particles to a viscous paste.

3. In the manufacture of 4'-chloro-2-benzoylbenzoic acid according to the Friedel and Crafts reaction, the process which comprises mixing substantially 1 molecular proportion of phthalic anhydride and substantially 2.5 molecular proportions of chlorobenzene with substantially 2.1 molecular proportions of anhydrous aluminum chloride in a crystallizing pan at an initial temperature of substantially 20° C. and a final temperature of substantially 70° C. over a period of substantially 10 hours, while continuously removing the liberated hydrogen chloride, and finally the excess of chlorobenzene under reduced pressure, and then discharging the resultant aluminum chloride addition compound of 4'-chloro-2-benzoylbenzoic acid in the form of a granulated product.

4. In the manufacture of ketones according to the Friedel and Crafts reaction, the process which comprises mixing an organic carboxylic acid and a reactive aromatic compound with anhydrous aluminum chloride in a crystallizing pan at a temperature range of 0°–200° C., until the conversion of the reactants to the anhydrous aluminum chloride addition compound of the ketone is complete, and then discharging the same in any desired form, ranging from a granulated product to a viscous paste.

5. The process according to claim 4, in which the corresponding acid anhydride is employed, instead of the carboxylic acid.

6. The process according to claim 4, in which the corresponding acid chloride is employed, instead of the carboxylic acid.

7. In the manufacture of 4-chloroacetophenone according to the Friedel and Crafts reaction, the process which comprises mixing substantially 1 molecular proportion of acetic anhydride and substantially 2 molecular proportions of chlorobenzene with substantially 3.3 molecular proportions of anhydrous aluminum chloride in a crystallizing pan at substantially 100° C. for a period of six hours, while continuously removing the liberated hydrogen chloride, and then discharging the resultant anhydrous aluminum choride addition compound of 4-chloroacetophenone as a viscous paste.

8. In the manufacture of chlorobenzophenone according to the Friedel and Crafts reaction, the process which comprises mixing substantially 1 molecular proportion of benzoic acid, and substantially 3 molecular proportions of chlorobenzene with substantially 2.5 molecular proportions of aluminum chloride in a crystallizing pan at 110° C. for substantially 12 hours, while continuously removing the liberated hydrogen chloride, and towards completion of the reaction, removing the excess of chlorobenzene under reduced pressure, and then discharging the resultant anhydrous aluminum chloride addition compound of 4-chlorobenzophenone as a granulated product.

9. As a new article of manufacture, an anhydrous aluminum chloride addition compound of a keto acid in the form of a dry granulated product.

10. As a new article of manufacture, an anhydrous aluminum chloride addition compound of a ketone in the form of a dry granulated product.

PHILIP H. GROGGINS.